United States Patent Office 3,500,322
Patented Mar. 10, 1970

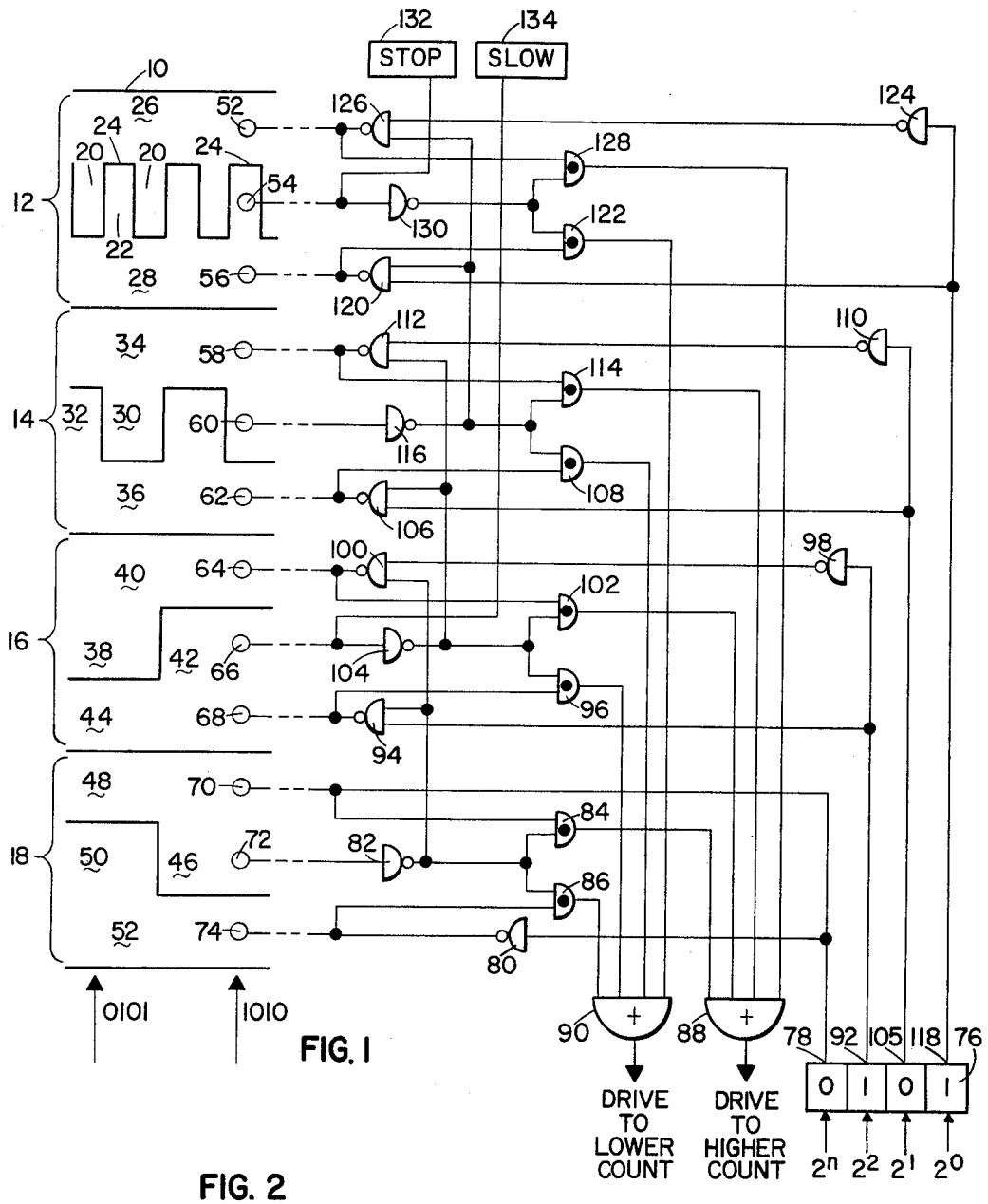

3,500,322
DIGITAL COMPARATOR
Walter L. Rochette, Glendora, Calif., assignor to Singer-General Precision, Inc., a corporation of Delaware
Filed May 19, 1967, Ser. No. 639,857
Int. Cl. H04l 3/00; G06f 7/02; H03k 13/00
U.S. Cl. 340—146.2          6 Claims

ABSTRACT OF THE DISCLOSURE

A digital comparator for detecting the approach to coincidence, and coincidence between a binary input signal and the mechanical movement of a coded member having a plurality of binary weighted switching tracks. Circuitry responsive to both the input signal and the existing position of the coded member produces electrical signals that indicate both the required direction for movement of the member to achieve coincidence, and the approach to coincidence.

CROSS REFERENCE TO RELATED APPLICATIONS

The invention described herein is an improvement over my invention described and claimed in copending patent application, Ser. No. 538,041, filed Mar. 28, 1966. That invention describes and claims the movable coded member and switching circuitry which detects coincidence and the approach to coincidence with a binary input signal. The present invention uses the same type of coded member but provides circuitry which not only detects coincidence but also produces signals which may be used to move the member through the shortest direction into coincidence.

BACKGROUND OF THE INVENTION

Comparison devices are well known in the art and are extensively used, for example, in the operation of automatic machine tools. The most common and well known coincidence detector, or comparator, is the well known electrical analog servo system. More recently, digital servo devices have been developed. Most of these devices use an analog to digital encoder which generates binary signals indicative of a shaft position. The signals are applied to a digital computer which computes the error signal and the amount of additional motion that is necessary to achieve coincidence between a command signal and the signal produced by the encoder.

The present invention provides a much simpler and far less expensive comparative device for detecting coincidence, or approach to coincidence, of a movable mechanical member to the command signal which represents desired position.

SUMMARY OF THE INVENTION

Briefly described, the present invention comprises a mechanically movable coded member having a plurality of tracks of varying ordinal significance, together with simple logic circuitry which provides electrical signals indicative of the shortest direction of movement to achieve coincidence. Each track of the coded member comprises two feed tracks and a switching track having segments alternately connected to each feed track. Binary command signals from an input register are applied to each feed track and a brush associated with the switching track is coupled to the logic circuitry which compares the present position of the coded member with the desired position represented by the binary input command signal. A logic circuitry can determine the required direction of travel of the coded member to achieve coincidence by the shortest direction. For example, if the input signal is a binary "0" and the present position of a track on the coded member indicates a binary "1," the logic circuitry will produce a signal indicating that the coded member should be driven in the particular direction necessary to detect a lower count. The converse is true if the binary command signal is greater than the signal detected at the present position of the coded member. When a position of coincidence of the highest order track has been achieved, the control is transferred to the circuitry associated with the next lower order track and the process continues through this circuitry, thence through the circuitry associated with the still lower significant digit tracks until coincidence is detected and all tracks of the coded member produce readings that correspond to the input command signals. Upon such coincidence, an electrical output signal is produced which may be used to stop the movement of the coded member.

BRIEF DESCRIPTION OF THE DRAWINGS

In the drawings which illustrate a preferred embodiment of the invention,

FIGURE 1 illustrates a section of the coded member and a block diagram of the associative circuitry; and FIGURE 2 illustrates the legend identifying the components used in the circuitry of FIGURE 1.

DESCRIPTION OF THE PREFERRED EMBODIMENT

Referring to FIGURE 1, the numeral 10 represents a movable input member having four commutator tracks, 12, 14, 16 and 18, each of which contain a switching track of segments representing a particular binary value. While only four commutator tracks are shown in FIGURE 1, it is obvious that greater accuracy can be achieved if many of such tracks are incorporated on the movable input member. Input member 10 may be a linear device, such as is illustrated, or may be in the form of a disk in which the commutator tracks are concentrically arranged on the surface of the disk. Movable member 10 is coupled to a mechanical component which is to be positioned through the control of the digital comparator.

As noted above, each commutator track contains a switching track of commutator segments representing particular binary values. Associated with each switching track are non-segmented commutator feed tracks. Thus, commutator track 12 comprises a plurality of conductive commutator segments 20 and 22, which are electrically insulated from each other by an insulating portion 24 and which are connected to the non-segmented commutator feed tracks 26 and 28, respectively. Similarly, commutator track 14 contains a switching track of conductive commutator segments 30 and 32 which are respectively coupled to feed tracks 34 and 36. Each successive commutator track contains similar segments and associated feed tracks, but, as noted in the figure, the segments of each higher order switching track have a width that is twice that of the next lower order switching track to form a typical binary pattern.

Positioned over and in electrical contact with each switching track and the associated feed tracks is an electrically conductive brush. Thus, associated with commutator track 12 is a brush 52 in contact with feed track 26, a brush 54 in contact with the switching track of segments 20 and 22, and a brush 56 in contact with feed track 28. Similar brushes are positioned in contact with each of the three portions of the subsequent higher order tracks, and are preferably mounted on a stationary brush block so that the movable member 10 is moved with respect to the brushes.

Each of the alternate segments in each switching track represent a particular binary state. Such a state may be considered to be an "On" and "Off," a "True" or "False," or "1" or "0." Segments 20 and their associated feedtrack 26 have been assigned the binary value of "1," and segments 22 and their associated feedtrack 28 have been assigned the binary value of "0." Similarly, a binary "1" has been assigned to segments 30, 38 and 46 and their associated feed tracks, in subsequent commutator tracks 14, 16 and 18, respectively. The brushes associated with the segmented switching tracks of each commutator track will therefore sense, in binary form, the present position of the movable member. Brush 72, associated with commutator track 18, the most significant digit track, senses a "1" by being in contact with segment 46. Brush 66 senses a "0" on segment 42, brush 60 senses a "1" from segment 30, and brush 54 senses a "0" from segment 22. Thus, the present position of the movable member 10 with respect to the brushes may be represented by the binary number 1010.

When it is desired to move the mechanical component which drives the movable member 10, a binary command signal representing the particular desired position to which the mechanical component is to be moved is introduced into register 76. The most significant digit terminal 78 of register 76 is coupled directly to brush 70 which is associated with feed track 48 of commutator track 18. On addition, terminal 78 is connected through an inverter 80 to brush 74, which is associated with feed track 52 of commutator track 18. Brush 72 which senses the particular present position binary state of the switching track in commutator track 18 is coupled through an inverter 82 to the input terminals of "AND" gates 84 and 86, the other input terminals of which are coupled to feed brushes 70 and 74, respectively. The output of "AND" gate is coupled to one input of an "OR" gate 88, the output of which produces a signal which commands that the mechanical component which drives movable member 10 be driven in a direction which will produce a higher count, in binary value, from movable member 10. The output of "AND" gate 86 is coupled with one input to "OR" gate 90, the output of which signals that the mechanical component should be driven in a direction representing a lower count from movable member 10. Thus, if a binary "0" appeared at the most significant digit terminal 78, this signal would be introduced into one terminal of "AND" gate 84 and would pass through brush 70, into the conductive segment 46, through brush 72 and would be inverted into a binary "1" by inverter 82. This binary "1" when presented to "AND" gate 84 along with the "0" input from terminal 78, would produce no output into "OR" gate 88. However, this "0" signal would be inverted by inverter 80 into a binary "1" which, when presented to "AND" gate 86 along with the binary "1" from inverter 82, would pass a signal to "OR" gate 90 to command that the mechanical component associated with movable member 10 be driven to a lower count to achieve coincidence.

As coincidence is achieved upon the most significant digit track of movable member 10, the control is passed from the most significant digit track to the next least significant digit track 16, and coincidence is obtained in accordance with the particular input applied to register 76. The terminal 92 of register 76 is connected to one input of a "NOR" gate 94, the second input to which is received from the output of inverter 82 associated with commutator track 18. "NOR" gates are well known in the art and may be considered as a standard "OR" gate followed by an inverter, so that a binary "1" output is obtained only when all inputs are at a binary "0" value. The output of "NOR" gate 94 is applied to brush 68 which is in contact with the "0" feed track 44 of commutator track 16, and is also connected as one input to "AND" 96. Terminal 92 is also coupled to an inverter 98 to an input terminal of "NOR" gate 100, the second input to which is obtained from the output of inverter 82. The output of "NOR" gate 100 is applied to brush 64 which is in contact with the "1" feed track 40 of commutator track 16, and is also coupled as one input to "AND" gate 102. Brush 66, which detects the particular present position of commutator track 16 by contacting the switching track is coupled to an inverter 104, the output of which is applied as the second input to "AND" gates 96 and 102. The output of "AND" gate 102 is applied as one input to "OR" gate 88 and the output of "AND" gate 96 is applied as one input to "OR" gate 90.

The circuitry associated with commutator tracks 12 and 14 is identical with that associated with commutator track 16. A signal appearing at terminal 105 of register 76 is applied directly to one input terminal of "NOR" gate 106, which receives a second input directly from the output terminal of inverter 104. The output terminal of inverter 106 is connected to brush 62 and to one input terminal of "AND" gate 108. The signal from terminal 105 is also applied through an inverter 110 to the input terminal of "NOR" gate 112, and the second input signal to "NOR" gate 112 is obtained from the output of inverter 104. The output terminal of "NOR" gate 112 is connected directly to brush 58 and to one input terminal of "AND" gate 114. Brush 60, which is positioned on the switching track of commutator track 14 is connected to an inverter 116, the output of which is applied as second inputs to "AND" gates 114 and 108. The output terminal of "AND" gate 114 is applied as one input to "OR" gate 88 and the output of "AND" gate 108 is applied as one input to "OR" gate 90.

Similarly, a signal appearing at terminal 118 of register 76 is applied directly to "NOR" gate 120, the second input to which is obtained from the output of inverter 116. The output of inverter 120 is applied directly to brush 56 and to the input terminal of "AND" gate 122. Terminal 118 is also connected to inverter 124, the output of which is applied to the input terminal of "NOR" gate 126. "NOR" gate 126 receives its second input signal from the output terminal of inverter 116, and produces, at its output, a signal which is coupled to terminal 52 and to the input terminal of "AND" gate 128. Brush 54 which contacts the switching track of commutator track 12 and detects the present binary state therefrom, is coupled to the input of an inverter 130, the output of which is connected to the second input terminals of "AND" gates 128 and 122. The output terminal of "AND" gate 128 is coupled as one input to "OR" gate 88 and the output terminal of "AND" gate 122 is applied as one input to "OR" gate 90.

Upon complete coincidence between the position of movable member 10 and the binary command signal applied to register 76, a binary "1" will be sensed by brush 54, associated with the switching track of commutator track 12. This binary "1" will appear only upon complete coincidence, and this signal may therefore be used to actuate a brake to stop the movement of the mechanical component which drives movable member 10. Accordingly, brush 54 may be coupled to a "stop" circuit 132 which may be a signal or a switching device. Similarly, as movable member 10 approaches coincidence, a binary "1" will be read by brush 66 associated with the segmented track of commutator track 16, and brush 60 associated with commutator track 14. Accordingly, either or both of these brushes may be coupled to a "slow" circuit 134, which may be a signalling device or a slow speed control for indicating that coincidence is approaching and that the mechanical component which drives movable member 10 should be slowed in order to avoid overdrive.

OPERATION

Before presenting an illustrated example of the operation of the digital comparator, the brief explanation of the operation of the various electronic components in the circuit will be given.

An inverter merely inverts the signal. If a binary "0" is presented to the input terminal of an inverter, a binary "1" will appear at the output terminal.

An "AND" gate requires that each and every input be a binary "1" before a binary "1" will appear at the output terminal.

An "OR" gate will produce a binary "1" at its output terminal if any or all signals appearing at the input terminal are a binary "1."

A "NOR" or "NOT-OR", gate is merely an "OR" gate with an inverter at its output, so that a binary "1" will appear at the output terminal only if all input terminals are at a binary "0."

A general rule that must be considered in the operation of the circuit illustrated in FIGURE 1 is that the circuitry associated with each commutator track can only produce an output that commands a drive to a lower count or a higher count if the particular brush that is associated with the switching track makes contact with a segment which is at a binary "0." The output of the inverter associated with that brush will then be inverted into a binary "1" which is necessary to activate the output "AND" gates. The output of the inverter is also fed to the next lower order circuit, and since this binary "1" is applied directly to "NOR" gates, their outputs must indicate a binary "0." As shown in FIGURE 1, the output terminals of the "NOR" gates are applied as inputs to "AND" gates which will always produce a binary "0" output if one of their input terminals is at a binary "0." Thus, when the circuitry associated with any commutator track is producing an output signal to a drive mechanism, all lower order circuits are inactivated, and become activated only upon coincidence of the higher order track with its associated input command signal through register 76.

From an inspection of FIGURE 1 it can be seen that the relative position of all brushes with respect to their associated commutator tracks indicate that the movable member 10 is at a present position indicated by the binary number 1010. If a command signal of 0101 is applied to register 76, the folowing sequence will take place:

The binary "0" appearing at terminal 78 will be applied to brush 70 and also as an input to "AND" gate 84. The binary "0" is also applied to inverter 80 and inverted into a binary "1" where it is applied to brush 74 and to input terminal of "AND" gate 86. Since brushes 70 and 72 are in contact with the conductive surface of feed track 48 and segment 46, the "0" present at brush 70 will be transferred to brush 72 where it will be inverted by inverter 82 into a "1." This signal is then applied to "AND" gate 86 along with the "1" appearing on brush 74. Since both inputs to "AND" gates 86 are "1," "AND" gate 86 will produce an output to "OR" gate 90, which commands that the mechanical component which drives movable member 10 be driven in a direction which will produce a lower count in movable member 10. Thus, movable member 10 will be driven toward the right, with respect to the brushes, until brush 72 passes from segment 46 into segment 50. At this point brush 72 will receive the signal appearing on the brush 74 and this "1," when inverted by inverter 82, will becomes a "0" and the output signal from "AND" gate 86 will be removed. Since the output of inverter 82 has now become a "0," the control of the digital comparator has been removed from commutator track 18 and transferred to the next lower order circuit which is associated with commutator track 16.

When brush 72 of commutator track 18 passes from segment 46 into segment 50, the brush 66 associated with track 16 will also pass from segment 42 into segment 38, and will sense the signal that appears on brush 64 which is associated with feed track 40. A binary "1" appearing at terminal 92 of register 76 is applied as one input to "NOR" gate 94, along with the "0" input derived from the output of inverter 82. The output of "NOR" gate 94 is therefore "0" and this signal is applied to the input of "AND" gate 96. The binary "1" appearing at terminal 92 is inverted by inverter 98 into a binary "0" which is applied, together with the "0" from inverter 82, to "NOR" gate 100. The "1" output of "NOR" gate 100 is applied to the input terminal of "AND" gate 102, to brush 64, and through the conductive segment 38 into brush 66, where it is inverted to a binary "0" by inverter 104. Since a binary "0" applied to any "AND" gate will produce a "0" output, gates 96 and 102 will produce no output signal.

When movable member is moved so that brush 72 associated with track 18 passes into segment 50, the brush 60, which is associated with commutator track 14 will pass through segment 32 into segment 30, and will receive signals that are applied to feed track 34 by brush 58. A binary "0" applied to terminal 105 of register 76 is applied directly to "NOR" gate 106, along with the "0" signal derived from inverter 104. "NOR" gate 106 will thus produce a "1" output which is applied to one input terminal of "AND" gate 108. The binary "0" from terminal 105 is inverted by inverter 110 into a binary "1," and is applied to "NOR" gate 112, along with the binary "0" derived from inverter 104. "NOR" gate 112 having inputs of "0" and "1," will produce a "0" output which is applied to brush 60 and to "AND" gate 114. The "0" applied to brush 60 is inverted by inverter 116 into a binary "1" and is applied to "AND" gates 108 and 114. Since "AND" gate 108 has received a binary "1" from inverter 116 and also from "NOR" gate 106, it will produce at its output a signal which is applied to "OR" gate 90 commanding that the movable member 10 be moved further to a lower count. Thus, movable member 10 will move further to the right with respect to the brushes until brush 60 passes from segment into segment 32. At this point brush 60 will sense the binary "1" that has been applied to feed track 36 by brush 62 and inverter 116 will produce a binary "0" which will stop the action of "AND" gate 108.

As movable member 10 moves further to the right so that brush 60 has entered a segment 32, brush 54 associated with commutator track 12 will pass over the segments and into segment 20. If a binary "0" is applied to terminal 118 of register 76, this signal will be applied to "NOR" gate 120, along with the "0" derived from inverter 116. "NOR" gate 120 will thus produce a binary "1" which is applied to brush 56 and to the input terminal of "AND" gate 122. Terminal 118 is also coupled to inverter 124, which inverts the binary "0" to a "1" which is applied to "NOR" gate 126 along with the binary "0" derived from inverter 116. "NOR" gate 126 will thus produce a "0" which is applied to brush 52 and to the terminal of "AND" gate 128. Since brush 54 is positioned in segment 20, it will receive the "0" signal from brush 52. This "0" is inverted by inverter 130 into a binary "1" and applied to the input terminals of "AND" gates 122 and 128. "AND" gate 122 now receives a binary "1" from inverter 130 and a binary "1" from "NOR" gate 120. Therefore, "AND" gate 122 will produce an output to "OR" gate 90 commanding that the movable member 10 be further moved to a lower count. Therefore, movable member 10 will move further to the right until such time as brush 54 passes from segment 20 into segment 22. At this point brush 54 will receive a binary "1" from brush 56, and this signal is inverted by inverter 130 into a "0" and applied to "AND" gates 122 and 128 to cause them to produce no signals to "OR" gates 88 or 90. When brush 54 receives a "1" by passing into segment 22, this signal is applied to stop mechanism 132, which may operate a switch or a signal signifying that complete coincidence has been achieved.

Having thus described one embodiment of the invention, what is claimed is:

1. A comparator for indicating coincidence between a movable binary coded input member and a binary input command signal and for producing output signals indicating the proper direction of movement of said input member to achieve coincidence, said comparator comprising:

(a) a movable input member having a plurality of commutator tracks, each track of said plurality having a switching track of equal length segments and first and second feed tracks coupled to alternate segments of said switching track, each of said switching tracks having segments of different lengths to form a binary coded pattern;

(b) first circuit means for applying a binary command signal to said first feed track and an inverted command signal to said second feed track of each of said plurality of commutator tracks; and (c) second circuit means coupled to said switching track and to said first and second feed tracks of each of said plurality of said commutator tracks for producing an output signal commanding a first direction of movement of said movable member when a binary "0" is sensed on a segment of said switching track and a binary "1" is present on said first feed track, and for commanding a second direction of movement of said member when a binary "0" is sensed on said segment and a binary "1" is present on said second feed track.

2. The comparator, as claimed in claim 1 wherein said first circuit means includes an input register for receiving command signals and for transmitting said signals to said first and second feed tracks of each of said plurality of commutator tracks.

3. The comparator, as claimed in claim 2, wherein said first circuit means includes a plurality of brushes positioned to contact said switching track and said first and said second feed tracks of each of said plurality of commutator tracks.

4. The comparator, as claimed in claim 3, wherein said first circuit means includes gating means interposed between said input register and the feed track brushes and responsive to the state of the switching segment in the next higher order commutator track for inhibiting command signals to said feed track brushes until said next higher order commutator track is in coincidence with the command signal to said next higher order commutator track.

5. The comparator, as claimed in claim 4, further including "stop" circuitry coupled to the switching track of the lowest order commutator track and responsive to a binary "1" sensed from said switching track.

6. The comparator, as claimed in claim 5, further including "slow" circuitry coupled to the switching track of a commutator track other than the lowest order track and responsive to a binary "1" sensed from said switching track.

References Cited

UNITED STATES PATENTS 3,211,976  10/1965  Brule et al.
3,248,727  4/1966  Anastasia _____ 340—347

EUGENE G. BOTZ, Primary Examiner

R. S. DILDINE, JR., Assistant Examiner

U.S. Cl. X.R.

340—347